United States Patent
Arikawa et al.

(10) Patent No.: US 10,998,973 B2
(45) Date of Patent: May 4, 2021

(54) SIGNAL COMBINING DEVICE AND SIGNAL COMBINING METHOD

(71) Applicant: NEC Corporation, Tokyo (JP)

(72) Inventors: Manabu Arikawa, Tokyo (JP); Toshiharu Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/605,321

(22) PCT Filed: Apr. 18, 2018

(86) PCT No.: PCT/JP2018/015937
§ 371 (c)(1),
(2) Date: Oct. 15, 2019

(87) PCT Pub. No.: WO2018/198891
PCT Pub. Date: Nov. 1, 2018

(65) Prior Publication Data
US 2020/0044737 A1    Feb. 6, 2020

(30) Foreign Application Priority Data

Apr. 25, 2017  (JP) .............................. JP2017-086264

(51) Int. Cl.
*H04B 10/118*     (2013.01)
*H04B 10/61*      (2013.01)
*H04B 17/336*     (2015.01)

(52) U.S. Cl.
CPC ........... *H04B 10/118* (2013.01); *H04B 10/65* (2020.05); *H04B 17/336* (2015.01)

(58) Field of Classification Search
CPC .... H04B 10/118; H04B 10/65; H04B 17/336; H04B 10/61; H04J 14/04
See application file for complete search history.

(56) References Cited

U.S. PATENT DOCUMENTS

| 8,989,602 B2 * | 3/2015 | Komaki ............. H04B 10/6166 398/208 |
| 2009/0245816 A1 * | 10/2009 | Liu ........................ H04B 10/65 398/208 |
| 2014/0126902 A1 | 5/2014 | Swanson et al. |

FOREIGN PATENT DOCUMENTS

| JP | 0738479 A | 2/1995 |
| JP | 2016139977 A | 8/2016 |

(Continued)

OTHER PUBLICATIONS

D. J. Geisler et al., "Multi-aperture Digital Coherent Combining for Free-space Optical Communication Receivers", Optical Communications Technology, Opt. Express 24, 12661, 2016 (10 pages total).

(Continued)

*Primary Examiner* — Christopher M Brandt

(57) ABSTRACT

The signal combining device includes: a plurality of first filters to subject each of a plurality of reception signals to processing with first filter coefficients, the plurality of reception signals being generated by subjecting optical signals to coherent detection; a plurality of second filters to subject outputs of the first filters to processing with second filter coefficients; a combiner to output combined signals acquired by combining outputs of the second filters; and a controller to perform adaptive control for each of the first filter coefficients and each of the second filter coefficients with different step sizes in each other, so that the combined signals are in a predetermined state, based on the reception signals input to the first filters and the combined signals, and to switch an update state of a filter coefficient of each of the first filters, based on magnitudes of the second filter coefficients.

19 Claims, 13 Drawing Sheets

(56) References Cited

FOREIGN PATENT DOCUMENTS

JP    2016144197 A    8/2016
WO   2015136572 A1   9/2015

OTHER PUBLICATIONS

Kohei Hosokawa et al., "Free-space Optical Receiver using SDM Technique to Overcome Atmosphere Turbulence", The Japan Society for Aeronautical and Space Sciences, Proceedings of 59th Space Sciences and Technology Conference, 1H16, 2015 (5 pages total).
International Search Report dated Jul. 10, 2018, in International Application No. PCT/JP2018/015937.
Written Opinion of the International Searching Authority dated Jul. 10, 2018, in International application No. PCT/JP2018/015937.

* cited by examiner

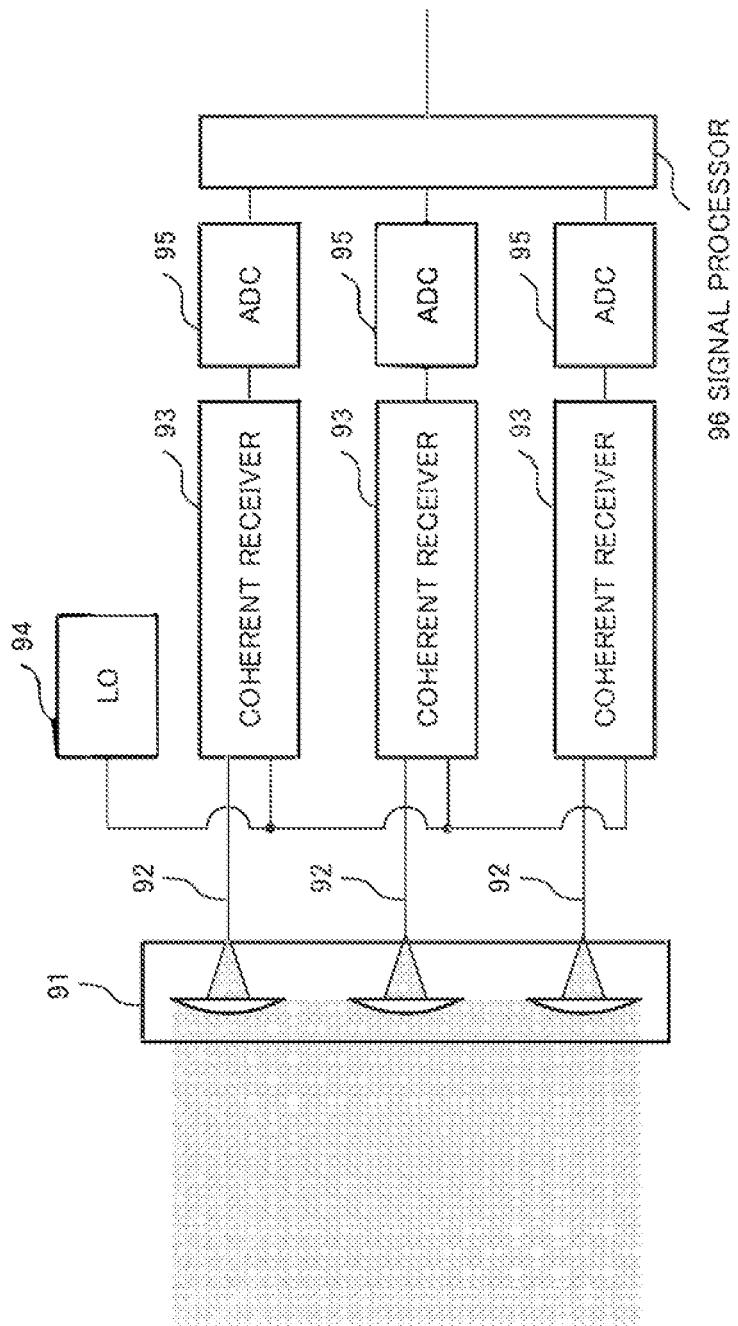
FIG.9 -- RELATED ART --

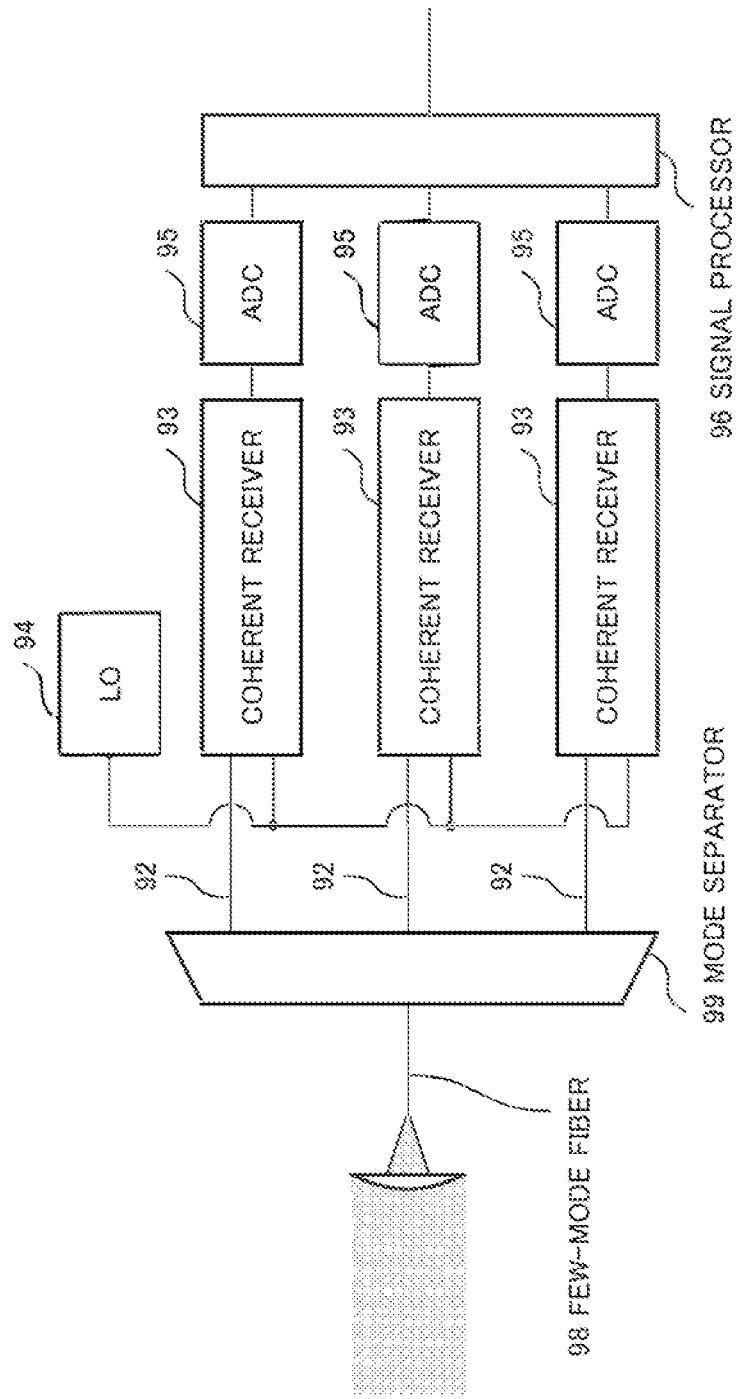
FIG.10 — RELATED ART —

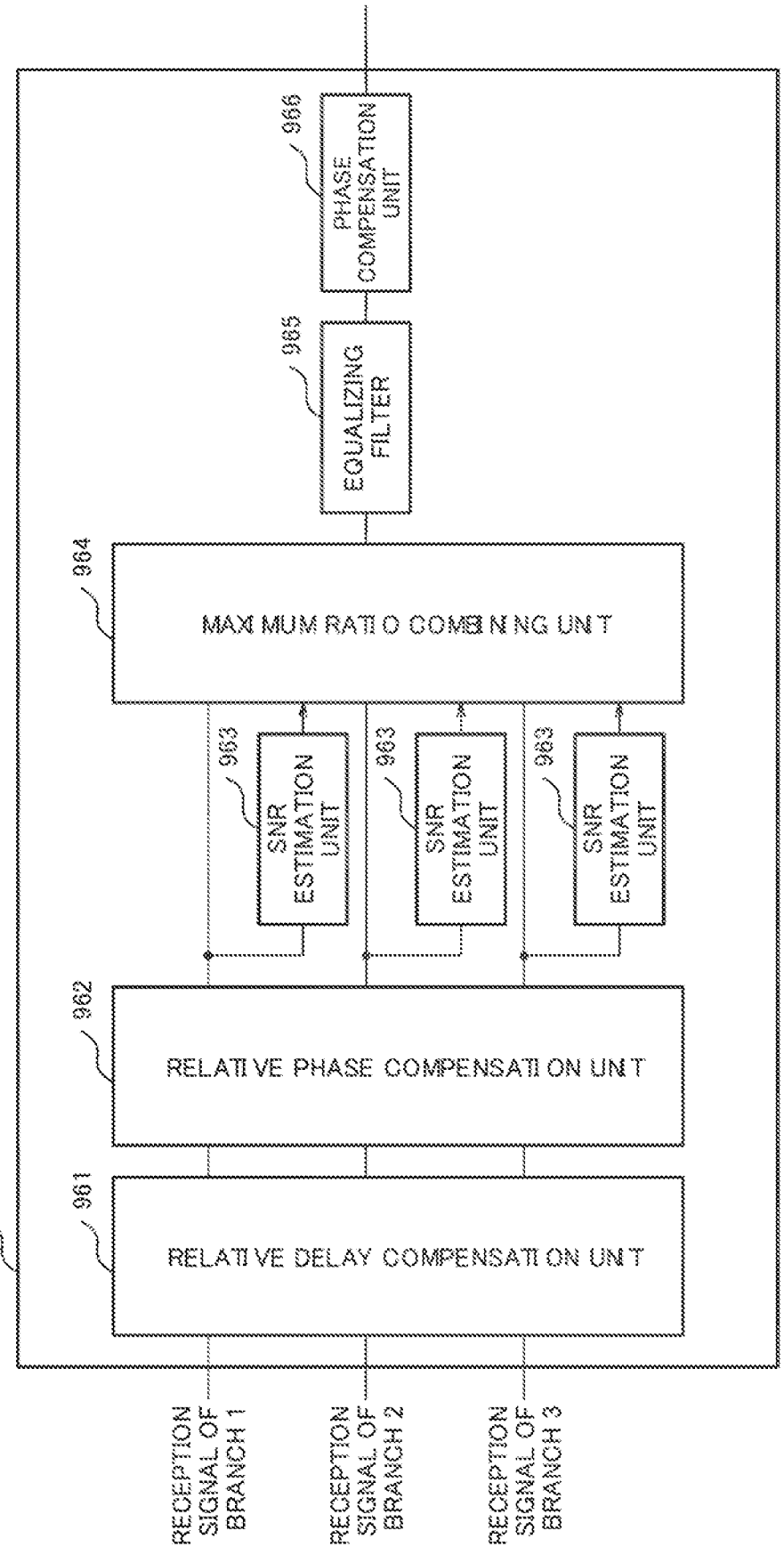
FIG.11 -- RELATED ART --

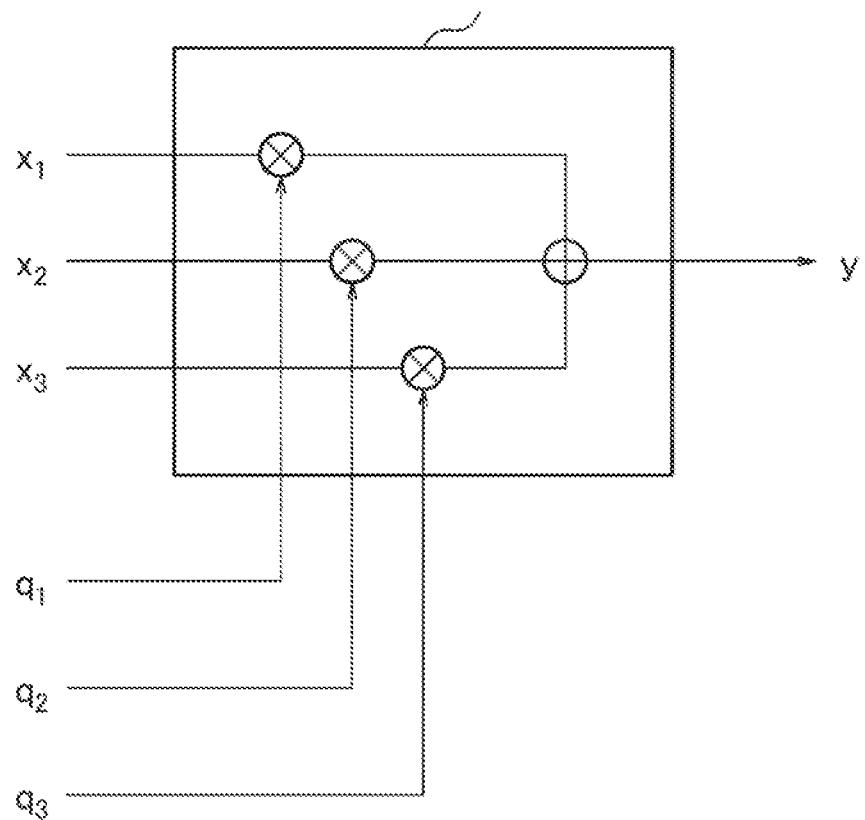
FIG.12 -- RELATED ART --

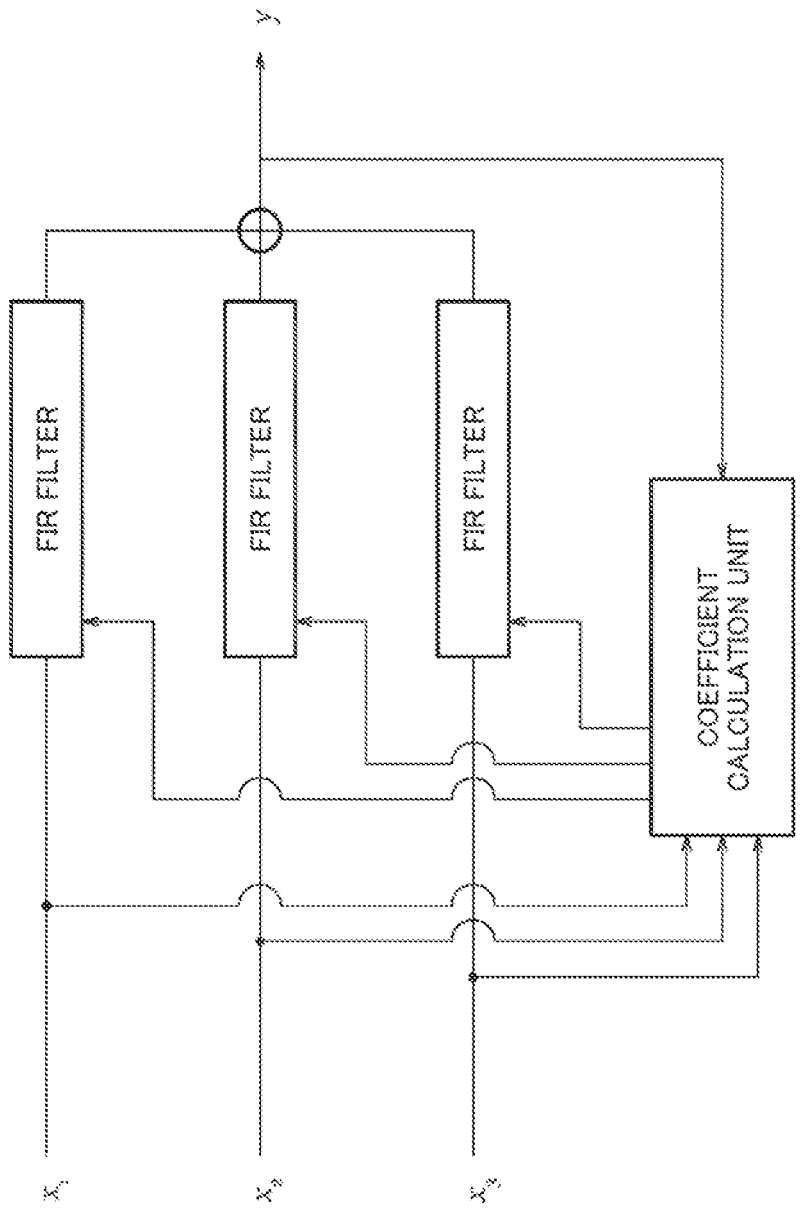

SIGNAL COMBINING DEVICE AND SIGNAL COMBINING METHOD

This application is a National Stage Entry of PCT/JP2018/015937 filed on Apr. 18, 2018, which claims priority from Japanese Patent Application 2017-086264 filed on Apr. 25, 2017, the contents of all of which are incorporated herein by reference, in their entirety.

TECHNICAL FIELD

The present invention relates to a signal combining device and a signal combining method, and more particularly to a signal combining device and a signal combining method that are used for combining a plurality of reception signals in an optical communication system.

BACKGROUND ART

Along with rising expectations for utilization of earth observation data from a flying object such as an artificial satellite, it has become important to be a larger capacity of a communication system for transmitting the observation data to the earth. However, general microwave communication undergoes legal restrictions and physical constraints for wider broadband to a large extent, and there is a limit on the use of the microwave communication for increasing the capacity of the communication system. In view of this, optical space communication, which is capable of achieving a larger capacity without practically undergoing band constraints, has gained an attention. Further, by using light with a shorter wavelength and higher directivity than a microwave, reduction in size and weight of a transceiver can be expected.

Nowadays, in most cases, a high-speed optical receiver is a device for a single-mode fiber (SMF) transmission. Thus, in order to achieve high-speed optical space communication between an artificial satellite and the earth, it is required to couple an optical signal, which is transmitted from an artificial satellite or the like and is propagated through the atmosphere, to an SMF. However, a general SMF has a small core diameter of approximately 10 μm, and hence drastic fluctuation and degradation (i.e., fading) is caused to coupling efficiency of a beam to the SMF when the beam propagated in a space is affected by disturbance on a wave front caused by atmospheric fluctuation.

One of effective approaches to solve the fading caused by atmospheric fluctuation is a diversity reception scheme using a plurality of receivers. When it is assumed that optical signals being input to the receivers are affected independently from each other by the atmospheric fluctuation, fading of a combined signal can be avoided in respect of probability by selecting a most satisfactory reception signal from the plurality of receivers or, as a more general way, combining a plurality of reception signals.

FIG. 9 is a diagram illustrating a configuration of an optical space communication receiver 90 of a space diversity type, which is described in NPL 1. The optical space communication receiver 90 receives optical signals through use of three telescopes 91, and combines the reception signals by digital signal processing. The three telescopes 91 include coupling systems corresponding to three SMFs 92, respectively. Each of the optical signals coupled to the SMFs 92 are received by coherent receivers 93. The coherent receivers 93 generate reception signals by mixing the optical signals and output light of a local oscillator (LO) 94 and then performing photoelectric conversion. The reception signals are digitalized by analog-to-digital converters (ADCs) 95, and are combined by a signal processor 96.

It is assumed that each of the telescopes 91 is in a spread of a received light beam and that the three telescopes 91 are spatially so away from each other that it can be regarded as no correlation between influences of the atmospheric fluctuation, which are affected by light entering openings of the telescopes. In this case, a diversity effect relieves the influence of fading with respect to the combined signal.

FIG. 10 is a diagram illustrating a configuration of an optical space communication receiver 97 of a mode diversity type, which is described in NPL 2. In the optical space communication receiver 97, a light beam is concentrated to a few-mode fiber 98 having a plurality of propagation modes. A mode separator 99 separates optical signals, which are coupled to the plurality of propagation modes of the few-mode fiber 98, for each propagation mode, and causes the optical signals to be coupled to the SMFs 92. The light propagated through the SMFs 92 is guided to the coherent receivers 93. The reception signals output from the coherent receivers 93 are digitalized by the ADCs 95, and are combined by the signal processor 96.

As a method of combining a plurality of reception signals, selection combining, equal gain combining, and maximum ratio combining are known. The selection combining is a procedure of selecting a signal with best characteristics from a plurality of reception signals and outputting the signal as a result of combining. The maximum ratio combining is a procedure of arranging phases of a plurality of reception signals and outputting, as a result of combining, a total signal acquired by summing up the signals while weighting in accordance with the characteristics of the signals. A signal-to-noise ratio (SNR) of the combined signal is a sum of SNRs of the reception signals before the combining. As described in NPL 1, the equal gain combining is a procedure of arranging phases of a plurality of reception signals and then outputting, as a result of combining, a total signal of the signals with same weighting. The characteristics of the signal acquired by the equal gain combining is less satisfactory than the signal acquired by the maximum ratio combining, but the processing is more simple.

FIG. 11 is a block diagram illustrating a general configuration of the signal processor 96. The signal processor 96 subjects reception signals, which are received from three reception lines (reception branches), to maximum ratio combining by digital signal processing. A relative delay compensation unit 961 and a relative phase compensation unit 962 remove a relative delay and a relative phase among the plurality of reception signals, and arrange a timing and a phase of the reception signals. SNR estimation units 963 estimate SNR of each of the reception signals, and output SNR estimation results to a maximum ratio combining unit 964. The maximum ratio combining unit 964 performs maximum ratio combining of the reception signals having the arranged timing and phase, based on the SNR estimation results. An equalizing filter 965 and a carrier phase compensation unit 966 perform equalization processing and carrier phase compensation for the combined reception signal. In this manner, demodulation of the reception signal is completed.

CITATION LIST

Patent Literature

PTL 1: Japanese Unexamined Patent Application Publication No. H07-038479

PTL 2: Japanese Unexamined Patent Application Publication No. 2016-139977

Non Patent Literature

NPL 1: D. J. Geisler et al., "Multi-aperture Digital Coherent Combining for Free-space Optical Communication Receivers,", (United States of America), Opt. Express 24, 12661 (2016).
NPL 2: Hosokawa et al., "Free-space Optical Receiver using SDM Technique to Overcome Atmosphere Turbulence", The Japan Society for Aeronautical and Space Sciences, Proceedings of 59th Space Sciences and Technology Conference, 1H16 (2015).

SUMMARY OF INVENTION

Technical Problem

FIG. 12 is a block diagram illustrating a general configuration of the maximum ratio combining unit 964. Reception signals $x_j$ (j=1, 2, and 3) from the reception branches, which have the arranged timing and phase, and corresponding weightings $q_j$ (j=1, 2, and 3) are input to the maximum ratio combining unit 964. As a result of combining, the maximum ratio combining unit 964 outputs the following.

$$y = \sum_{k=1}^{3} q_k x_k \quad (1)$$

In order to perform weighting proportionally to amplitude of each of the reception branches, in maximum ratio combining, a weighting $q_j$ of a branch j is a positive square root of an SNR estimated for the reception signal of the branch. The maximum ratio combining is a method of maximizing an SNR acquired after the combining, and fading in the thus combined signal is reduced by a diversity effect.

Here, in order to sufficiently utilize an advantageous effect of maximum ratio combining, the combining needs to be performed appropriately even with respect to a reception signal of a reception branch, the reception signal having an extremely small SNR. For this, it is required that an SNR can be estimated with high accuracy even for a reception signal with an extremely small SNR, i.e., a reception signal containing an extremely large noise components. However, in general, it is difficult to perform SNR estimation with high accuracy with respect to a reception signal with a large noise components included. Further, in order to perform SNR estimation with high accuracy, demodulation processing such as carrier phase compensation is required for the reception signal, but the processing cannot be performed in a state that an SNR is extremely small. Furthermore, in a case where the above-mentioned technique is applied to optical space communication, an SNR received by each of the reception branches fluctuates at high speed, depending on a change in an atmospheric state in a propagation path, and hence it is required to estimate the SNR at speed higher than the fluctuation speed. Thus, by obtaining time average for a long time period, there is a limit in relieving an influence of random noise components. As a result, it becomes further difficult to perform SNR estimation at high speed and with high accuracy, and a weighting appropriate for maximum ratio combining cannot be determined for a reception signal of a reception branch, which has an extremely small SNR.

As another method of calculating a weighting of each of the reception branches for maximum ratio combining, a method using an adaptive filter technique is known. PTL 1 describes a method of subjecting reception signals of each of reception branches to processing with a finite impulse response (FIR) filter and combining the results. A coefficient of the FIR filter is calculated by using a correlation between a determination result of the combined signal and each of the reception signals. The technique described in PTL 1 acquires robustness with respect to a deviation of a clock timing reproduced in a decision feedback equalizer, by shifting a tap from the center of the FIR filter to the output of the filter.

However, the technique described in PTL 1 also requires time average for a long time period in order to calculate a correlation between the determination result of the combined signal and each of the reception signals. Thus, in a case where a state of a propagation path fluctuates at high speed as the optical space communication, there arises a problem in that, as described above, it is difficult to calculate a filter coefficient at high speed and with high accuracy.

PTL 2 describes a method of transmitting polarization multiplexing optical signals via a plurality of channels in optical fiber communication, performing, on a reception side, polarization separation with an adaptive filter using a constant modulus algorithm (CMA), and thereafter performing a combining with the adaptive filter using the same CMA.

FIG. 13 is a diagram illustrating a configuration of the combining performed with a general adaptive filter 80 using an FIR filter. A filter coefficient of the adaptive filter 80 is successively updated by a certain step size t. As the step size is increased, a convergence of adaptive control is made fast, which increases a deviation from an ideal value of a filter coefficient due to noise components contained in the reception signals and degrades characteristics of the combined signal. Further, when a reception signal of a certain reception branch has an SNR extremely smaller than those of other reception signals, all the filter coefficients of the FIR filter applied to the reception signal get close to 0 as a result of adaptive control, and only a slight component caused by noise remains. Further, this increases a time period required for re-convergence of a filter coefficient when the SNR of the reception branch is increased again.

OBJECT OF INVENTION

The object of the present invention is to provide a technique of combining reception signals by calculating a filter coefficient at high speed and at high accuracy, which is applicable to an optical space communication system adopting a diversity reception scheme.

Solution to Problem

A signal combining device of the present invention includes:
a plurality of first filters configured to subject each of a plurality of reception signals to processing with first filter coefficients, the plurality of reception signals being generated by subjecting optical signals to coherent detection;
a plurality of second filters configured to subject outputs of the first filters to processing with second filter coefficients;
combination means for outputting combined signals acquired by combining outputs of the second filters; and
control means for performing adaptive control for each of the first filter coefficients and each of the second filter coefficients with different step sizes in each other, in such a way that the combined signals are in a predetermined state, based on the reception signals input to the first filters and the combined signals, and for switching an update state of a filter coefficient of each of the first filters, based on magnitudes of the second filter coefficients.

A signal combining method of the present invention includes:

subjecting each of a plurality of reception signals to processing with first filter coefficients by using first filters, the plurality of reception signals being generated by subjecting optical signals to coherent detection;

subjecting each of outputs of the first filters to processing with second filter coefficients, by using second filters;

outputting combined signals acquired by combining outputs of the second filters;

performing adaptive control for each of the first filter coefficients and each of the second filter coefficients with different step sizes in each other, in such a way that the combined signals are in a predetermined state, based on the reception signals input to the first filters and the combined signals; and switching an update state of a filter coefficient of each of the first filters, based on magnitudes of the second filter coefficients.

Advantageous Effects of Invention

The present invention enables an optical receiver to combine reception signals with calculating a filter coefficient at high speed and at high accuracy.

BRIEF DESCRIPTION OF DRAWINGS

FIG. 9 is a diagram illustrating a configuration of an optical space communication receiver 90 of a space diversity type, which is described in NPL 1.

FIG. 10 is a diagram illustrating a configuration of an optical space communication receiver 97 of a mode diversity type, which is described in NPL 2.

FIG. 11 is a block diagram illustrating a general configuration of a signal processor 96.

FIG. 12 is a block diagram illustrating a general configuration of a maximum ratio combining unit 964.

FIG. 13 is a diagram illustrating a general configuration of an adaptive filter 80 using an FIR filter.

EXAMPLE EMBODIMENT

In the following, description is made on example embodiments of the present invention. In each of the drawings, each arrow denoted between constituent elements is used for description of each of the example embodiments, and does not limit an orientation of a signal.

First Example Embodiment

Figure 1:
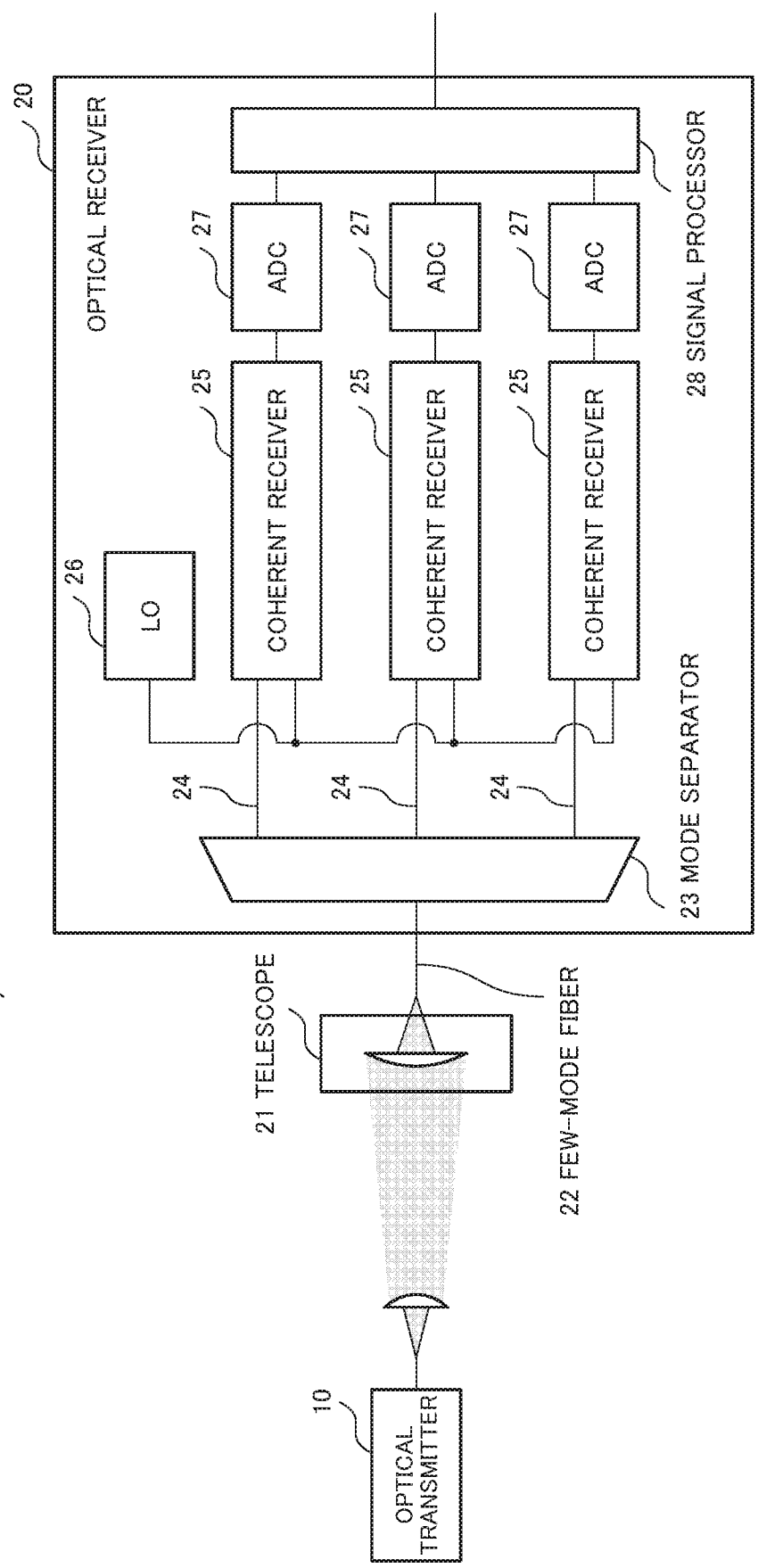
FIG. 1 is a diagram illustrating a configuration example of an optical space communication system 1.

FIG. 1 is a diagram illustrating a configuration example of an optical space communication system 1 according to a first example embodiment of the present invention. The optical space communication system 1 is an optical communication system using a diversity combination digital signal processing, and includes an optical transmitter 10 and an optical receiver 20. The optical transmitter 10 transmits a single optical signal, and the optical receiver 20 receives the optical signal propagating through an atmosphere.

The optical receiver 20 is an optical receiver of a mode diversity type, and includes a telescope 21, a few-mode fiber (FMF) 22, a mode separator 23, and single-mode fibers (SMFs) 24.

The optical receiver 20 further includes coherent receivers 25, a local oscillator (LO) 26, analog-to-digital converters (ADCs) 27, and a signal processor 28.

The telescope 21 includes a lens, and couples received optical signals to the few-mode fiber 22. The mode separator 23 functions as a mode separation means for separating the optical signals, which are coupled to propagation modes of the few-mode fiber 22, for each of the propagation modes. It is assumed herein that the number of propagation modes of the few-mode fiber is three. Outputs of the mode separator 23 are guided to the three SMFs 24 for each mode. The coherent receivers 25 each function as a coherent reception means for subjecting the optical signals to intradyne detection. The optical signals guided to the SMFs 24 are mixed with local oscillation light output from the local oscillator 26 at the coherent receivers 25, and are subjected to intradyne detection. The optical signals are converted into reception signals being electric signals at the coherent receivers 25. The ADCs 27 each function as an analog-to-digital conversion means, and convert the reception signals into digital data while sampling the reception signals. The signal processor 28 subjects the reception signals, which are converted into digital data, to digital signal processing, and outputs the reception signals.

The coherent receivers 25 are prepared as many as the number of modes for which the mode separator 23 performs separation.

The ADCs 27 are prepared twice as many as the number of coherent receivers in order to sample inphase components and quadrature components of the reception signals output from the coherent receivers.

The output signals of the coherent receivers can be expressed collectively in a form of a complex number, and hence the output of each of the coherent receivers 25 is indicated with one line in FIG. 1 and subsequent drawings.

In the present example embodiment, it is assumed that the received optical signals are subjected to binary phase shift keying (BPSK) modulation at the optical transmitter 10. In this case, it is assumed that polarization diversity is not considered and that a sampling rate of the ADCs 27 is oversampling, which is twice as high as a symbol rate.

Figure 2:
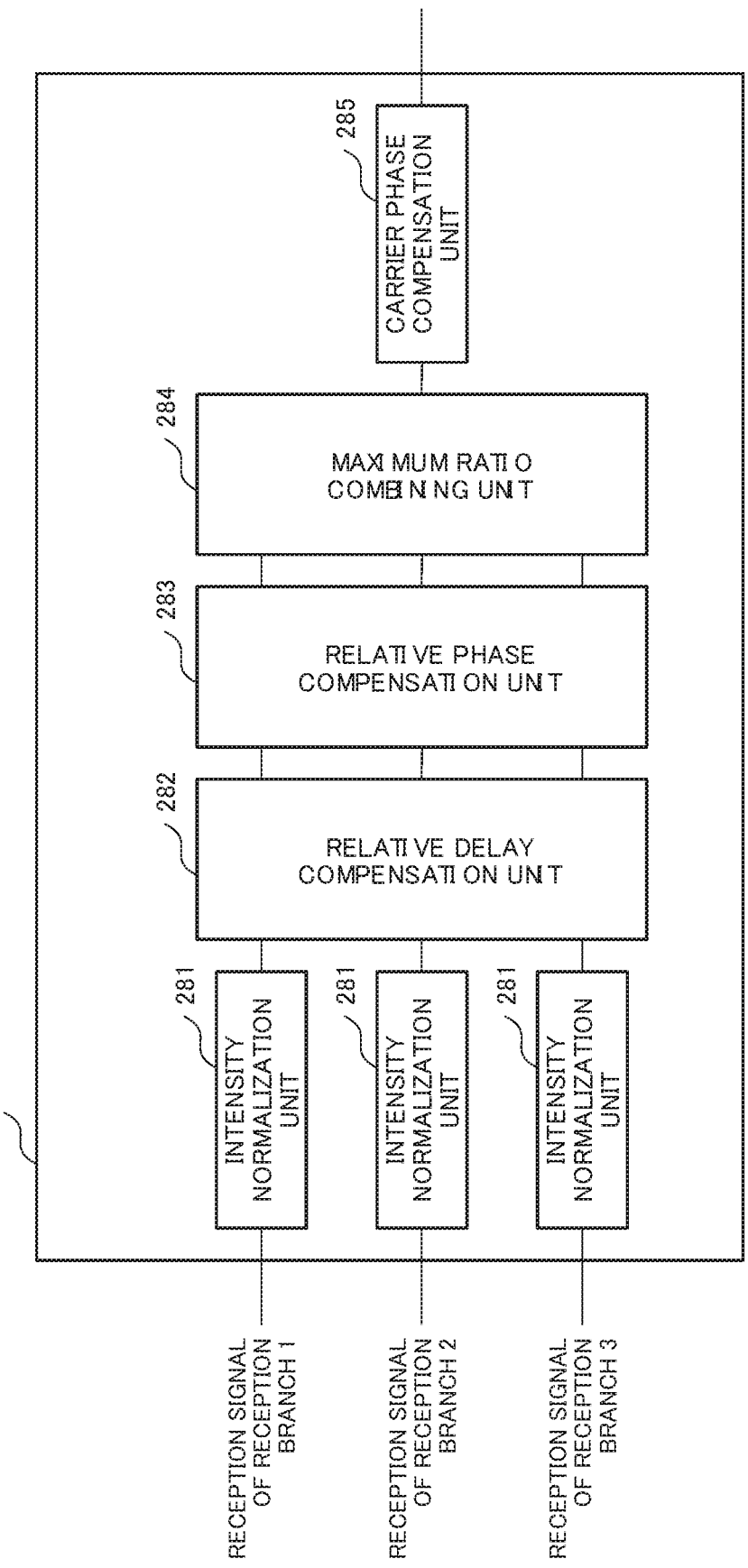
FIG. 2 is a block diagram illustrating a configuration example of a signal processor 28.

FIG. 2 is a block diagram illustrating a configuration example of the signal processor 28. The reception signals corresponding to reception branches are first subjected to intensity normalization at intensity normalization units 281 independently. The intensity normalization units 281 each function as an intensity normalization means for normalizing intensity of the reception signals. A relative delay compensation unit 282 functions as a relative delay compensation means for removing a delay between the reception signals of different reception branches.

A relative phase compensation unit 283 functions as a relative phase compensation means for removing a phase difference between the reception signals. Here, a relative delay between the two reception signals are calculated based on a cross correlation. A relative phase is calculated by time-averaging a complex conjugate product of one reception signal and another reception signal and obtaining an argument thereof.

A maximum ratio combining unit 284 subjects, to maximum ratio combining (MRC), the plurality of reception signals having a timing and a phase that are thus arranged. The maximum ratio combining unit 284 further removes a sample at a timing of a symbol shift from the reception signals, and outputs the combined reception signals to a carrier phase compensation unit 285. The carrier phase compensation unit 285 functions as a carrier phase compensation means for subjecting the combined reception signals to compensation of a carrier phase and outputting the signals as modulated signals. By further subjecting the modulated signals to decoding processing such as symbol determination or error correction, which is not shown processing function, transmission data are reconstructed.

Figure 3:
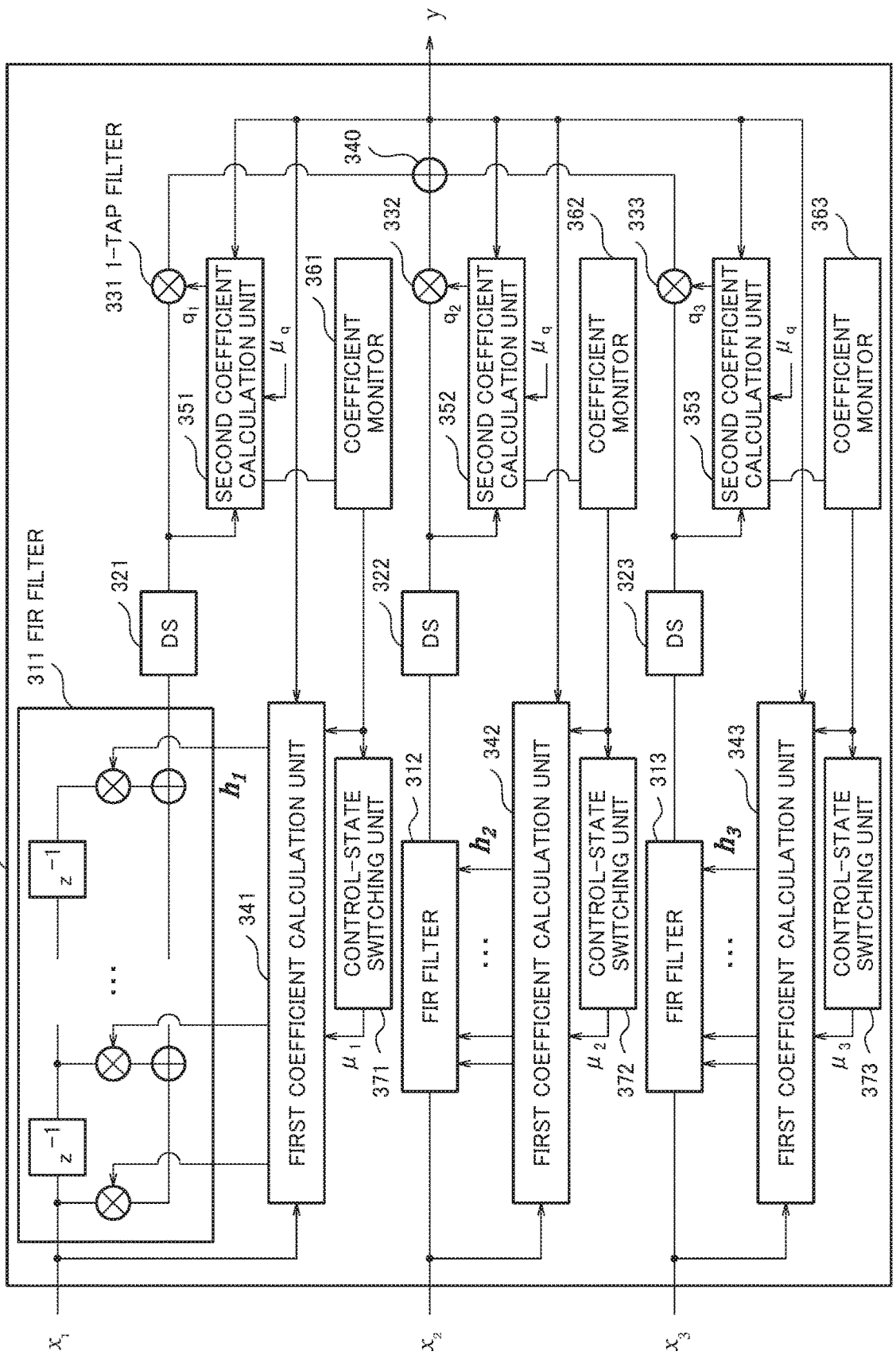
FIG. 3 is a block diagram illustrating a configuration example of a maximum ratio combining unit 284.

FIG. 3 is a block diagram illustrating a configuration example of the maximum ratio combining unit 284. The reception signals of the reception branches j (j=1, 2, and 3) from a time 1+1−M to a time 1 can be expressed as in the following.

$$x_j = (x_j[l], \ldots, x_j[l+1-M])^T \quad (2)$$

From now on, a left side of Equation (2) is indicated with $[x_j]$ in the description.

A reception signal $[x_j]$ is input to FIR filters 311 to 313 being M taps, and a filter coefficient $[h_j]$ is convoluted. Here, $[h_j]$ indicates a left side of Equation (3) given below.

$$h_j = (h_j[1], \ldots, h_j[M])^T \quad (3)$$

In Equations (2) and (3), T indicates transpose. Outputs of the FIR filters 311 to 313 are subjected to down-sampling at a symbol rate at down-sampling (DS) units 321 to 323. The signals subjected to down-sampling are input to 1-tap filters 331 to 333. The 1-tap filters 331 to 333 multiply the input signals by filter coefficients $q_j$ (qi to $q_3$), and outputs the signals. All the reception signals of the reception branches, which are output from the 1-tap filters 331 to 333, are added together at an adder 340, and a combined signal y being an addition result is acquired. The adder 340 is also referred to as a combiner. The combined signal y is expressed as in Equation (4) given below.

$$y = \sum_{k=1}^{K} q_k h_k^T \cdot x_k \quad (4)$$

Here, K=3 is satisfied. For description, in the following, the filter coefficient of the FIR filters 311 to 313 is referred to as a first coefficient, and the filter coefficient of the 1-tap filters 331 to 333 is referred to as a second coefficient.

The first coefficient and the second coefficient of the reception branch j are subjected to adaptive control by a stochastic gradient descent method through use of the input signals to the filters and the combined signal y. In this case, as an adaptive control method, constant modulus algorithm (CMA) is used. In the CMA, control is performed in such a way that an amplitude of the combined signal y becomes close to a constant value. In other words, a filter coefficient is updated in such a way that $\varepsilon^2$ is minimized with respect an error signal $\varepsilon$. Here, the error signal e is expressed in Equation (5) given below.

$$\varepsilon = 1 - |y|^2 \quad (5)$$

Further, update rules for the first coefficient and the second coefficient are as expressed in Assignment Expressions (6) and (7) given below.

$$h_j \rightarrow h_j + \mu_j \varepsilon y q_j^* x_j^* \quad (6)$$

$$q_j \rightarrow q_j + \mu_q \varepsilon y (h_j^T \cdot x_j)^* \quad (7)$$

Here, $\mu_j$ is a step size for updating the first coefficient of the reception branch j, and $\mu_q$ is a step size for updating the second coefficient. Regarding the step size for updating the second coefficient, the same value $\mu_q$ is used for all the reception branches. Further, by securing the step size for updating the second coefficient, which is larger than a set value of the step size for updating the first coefficient, high-speed fluctuation of an SNR due to atmospheric fluctuation is followed. First coefficient calculation units 341 to 343 and second coefficient calculation units 351 to 353 calculate first coefficients and second coefficients, respectively, and the calculated coefficients are set as filter coefficients for the filters.

At the reception branches, the second coefficients are monitored by coefficient monitors 361 to 363 at an interval of a certain time period. The coefficient monitors 361 to 363 transmit the monitored second coefficients to control-state switching units 371 to 373. The control-state switching units 371 to 373 compare magnitudes of the transmitted second coefficients with threshold values, and control an update state of the first coefficients based on the results.

Figure 4:
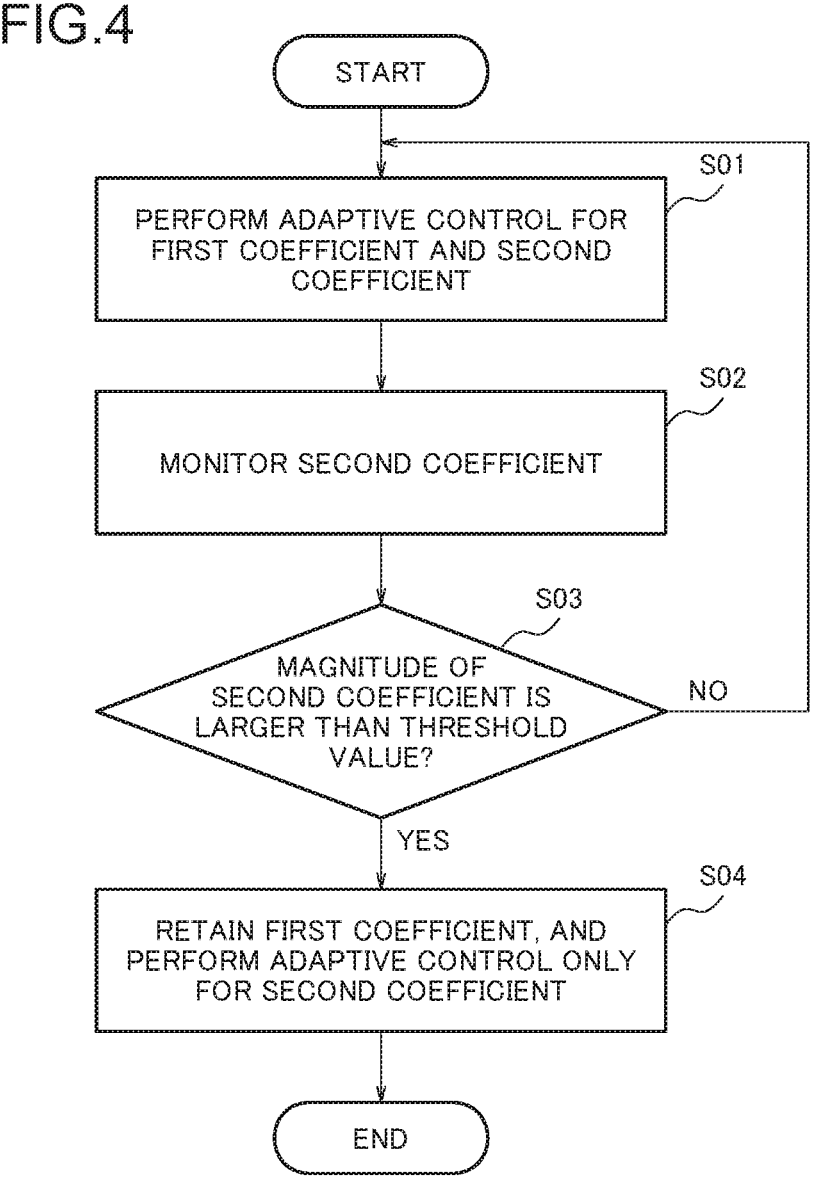
FIG. 4 is a flowchart in a first example of filter coefficient adaptive control.

FIG. 4 is a flowchart in a first example of control in an update state of the first coefficient in the filter coefficient adaptive control for the reception branch j. FIG. 4 is a flow including a case where the first coefficient is dealt with statically, and corresponds to a case where change in characteristics during operation of transmitting/receiving devices is negligible.

First, by setting the step size for updating the first coefficient to j and the step size for updating the second coefficient to $\mu_q$, adaptive control is started for both the first coefficient and the second coefficient (Step S01 in FIG. 4). After update of both the filter coefficients is converged, the coefficient monitors 361 to 363 monitor the second coefficient, and compare the magnitude of the coefficient with the threshold values (Step S02). When the comparison result is smaller than the threshold value (Step S03: No), there is a possibility that the first coefficient has attempted to perform adaptive control to the reception signal with excessively low SNRs. In this case, there is a possibility that the calculated first coefficient is largely deviated from an ideal value, and hence the process is returned to the adaptive control for both the first coefficient and the second coefficient (Step S01).

In contrast, when the magnitude of the second coefficient is equal to or larger than the threshold value (Step S03: Yes), it is conceived that convergence is completed under a state in which the first coefficient has relatively high SNRs. In this case, the first coefficient calculated under this condition is less deviated from the ideal value. Therefore, the update state of the first coefficient is controlled in such a way that the first coefficient at this point is remained, the update of the first coefficient is stopped, and adaptive control only for the second coefficient continues (Step S04). In Step S04, the control-state switching units 371 to 373 instruct the corresponding first coefficient calculation units 341 to 343 to stop the update of the first coefficient.

Figure 5:
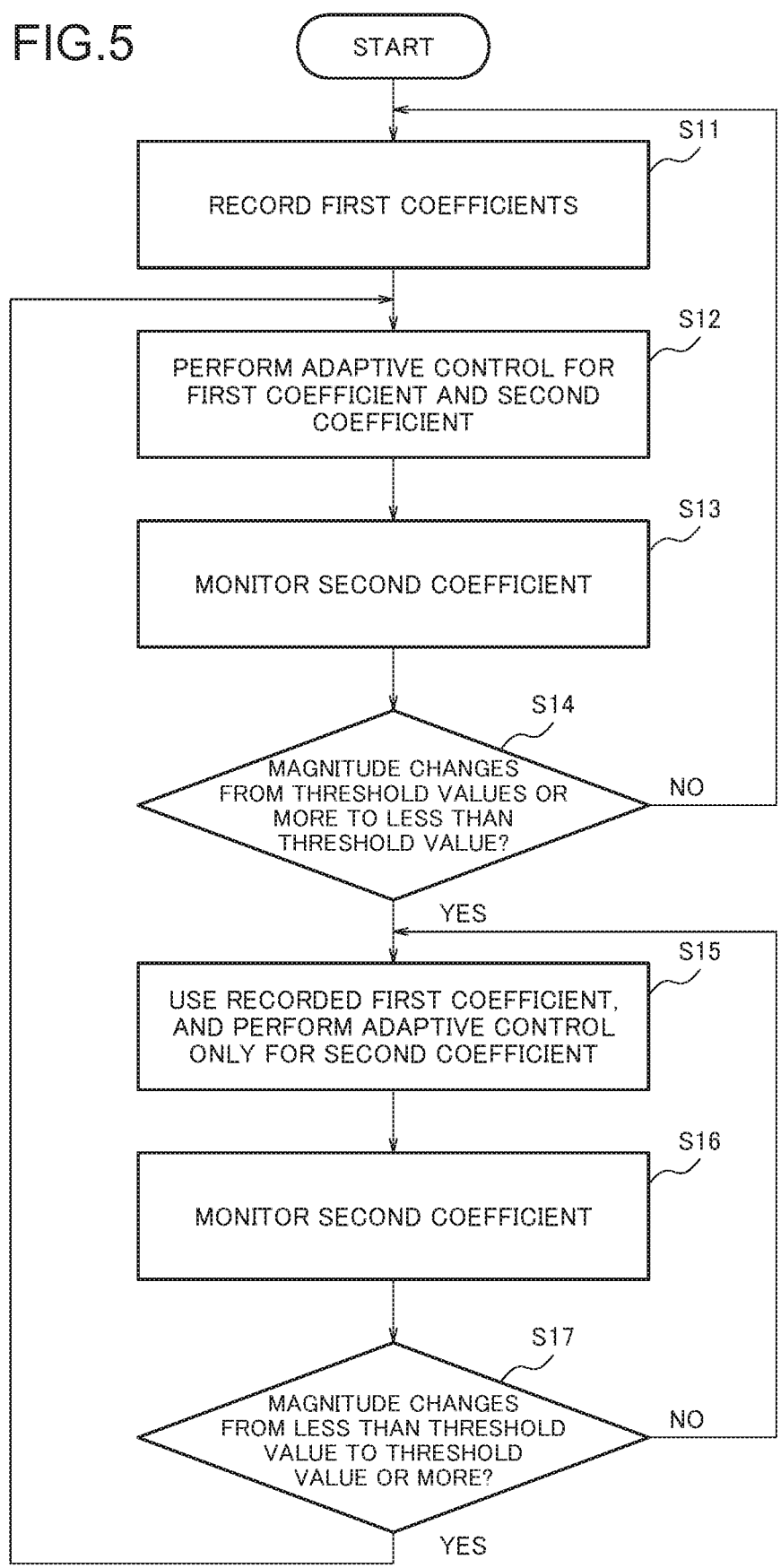
FIG. 5 is a flowchart in a second example of filter coefficient adaptive control.

FIG. 5 is a flowchart in a second example of switching of the update state of the first coefficient in the filter coefficient adaptive control for the reception branch j. In a case where change in characteristics during operation of transmitting/receiving devices used in the optical space communication system 1 is at low speed with respect to atmospheric fluctuation but yet is not negligible, the first coefficient may be dealt with substantially statically as in the flowchart in FIG. 5. In the procedure in FIG. 5, similarly to the previous example, by setting the step size for updating the first coefficient to tj and the step size for updating the second coefficients to $k_q$, adaptive control is started for both the first coefficient and the second coefficient. An initial value of the second coefficient is set to values larger than the threshold values used by the control-state switching units 371 to 373. Further, the first coefficient to be used is recorded (Step S11 in FIG. 5). Adaptive control for the first coefficient and the second coefficient is performed (Step S12), and the second coefficient is monitored when the update is converged (Step S13). In the flow in FIG. 5, the coefficient monitors 361 to 363 detect whether change that the magnitude of the second coefficient is less than the threshold value is caused (Step S14). When such change is not caused (Step S14: No), it is conceived that the SNRs of the reception signal of the reception branch is relatively satisfactory. Thus, the latest first coefficient that is updated is recorded (Step S11), and the update state of the first coefficient is controlled in such a way that the adaptive control for the first coefficients continues. Further, the adaptive control for the second coefficient also continues (Step S12).

When a change that the magnitudes of the second coefficient is less than the threshold value is caused (Step S14: Yes), the SNR of the reception signal of the reception branch is low, and the adaptive control for the first coefficient under this state is highly liable to cause the deviation from the ideal values to increase. Thus, the update state of the first coefficient is controlled to stop the update of the first coefficient, and the adaptive control is performed only for the second coefficient using the first coefficient recorded in Step S11 (Step S15). Under the state in which the adaptive control is performed only for the second coefficient, the second coefficient is monitored again (Step S16), and it is detected whether a change that the magnitude of the second coefficient is equal to or more than the threshold value is caused (Step S17). When such a change is caused (Step S17: Yes), it is conceived that the state in which the SNR of the reception signal of the reception branch are relatively low is solved. In this case, the state is returned to the state of the adaptive control for both the first coefficient and the second coefficient (Step S12). When such a change is not caused (Step S17: No), the adaptive control only for the second coefficient continues (Step S15).

In this manner, in both the case where the first coefficient are dealt with statically (FIG. 4) and the case where the first coefficient is dealt with substantially statically (FIG. 5), the first coefficient can be prevented from being updated in a state with low SNR, the filter coefficients appropriate for maximum ratio combining can be calculated at high speed and at high accuracy. The first coefficients mainly have a function of compensating for characteristics of the transmitting/receiving devices. Thus, in a case of a system in which optical space communication is performed between a plurality of artificial satellites and a certain earth station, by recording the first coefficients, which are calculated at the latest communication time for each artificial satellite, in an external device and using the first coefficients as the initial values, it can be expected that the initial convergence is performed at higher speed. Further, when a number of reception signals are combined, those signals are divided into a plurality of groups and are combined, and the combined signals of the plurality of groups are further combined. Such stepwise combining is conceivable. The present method is also applicable to such a case. In order to use the first coefficients for static compensation of characteristics and the second coefficients for high-speed and highly accurate calculation of weightings for maximum ratio combining, in place of or in addition to updating the first coefficients by a small step size and the second coefficients by a large step size, update frequency for the first coefficients may be lower than that for the second coefficients.

With regard to the processing that the control-state switching units 371 to 373 determine whether the SNRs of the reception branches are low or not by comparing the magnitudes of the second coefficients with the threshold values, the processing can be performed at higher accuracy by using SNRs estimated for the combined signals. The combined signals are expected to have SNRs relatively higher than the signals before being combined, and hence the estimation for the SNRs can be performed at high accuracy. Further, the weightings of the SNRs with which maximum ratio combining is achieved, with respect to signals with intensity-normalized ρ are expressed with a value (8) given below.

$$\sqrt{\rho(1+\rho)} \qquad (8)$$

Further, the SNR after the combining is a total sum of the SNRs before the combining, and sums of squares of the weightings become constant when, with respect to input signals subjected to intensity normalization, the signals after the combining, which are subjected to intensity normalization like CMA, are output. In consideration of those factors, the SNRs of the reception branches before the combining can be estimated. Thus, when a convergence condition of the first coefficients with respect to the SNRs is estimated in advance, and threshold values for the SNRs which are conceived that the coefficient is converged to valid value are set, the update state of the first coefficients can be switched appropriately by comparing the threshold values and the estimated SNRs before the combining with each other.

The function of the signal processor 28 described above may be achieved with hardware of an electric circuit. Alternatively, the function of the signal processor 28 may be programmed, and the function may be achieved by causing a computer included in the signal processor 28 to execute the program.

The program may be stored in a computer-readable non-transitory recording medium (for example, a semiconductor memory included in the signal processor 28).

An advantageous effect of the diversity combination digital signal processing at the maximum ratio combining unit 284, which is described above, is examined by a simulation. Transmittance signals are BPSK signals of 10 gigabit per second (Gb/s), and are received by an optical space communication receiver of a mode diversity type using a few-mode fiber with six modes. Shot noise is considered as a main noise source, and differential coding is not performed. An offset and a line width of a frequency of local oscillator light are set to 300 MHz and 100 kHz, respectively. The simulation is performed to twenty groups with random reception light intensity, each of which has different reception light intensity for each reception branch and average reception light intensity per branch of −60 dBm, and comparison is made on BERs after the combining. The simulation is carried out by maximum ratio combining in which SNR estimation is performed and adaptive control with CMA using normal FIR filters, in addition to the method proposed in the present example embodiment. In maximum ratio combining in which SNR estimation is performed, a calculation method based on distribution of intensity of reception signals is used as the SNR estimation method. In this method, SNRs with reception light intensity of −60 dBm or lower cannot be determined, and hence such reception signals are not subjected to the combining.

In the method proposed in the present example embodiment, a step size for updating the first coefficients is set to $10^{-4}$, a step size for updating the second coefficients is set to $10^{-2}$. In the adaptive control with CMA using normal FIR filters, a step size for update is set to $10^{-3}$. When the step size is larger than this, the filter coefficients diverge, and cannot be converged.

Figure 6:
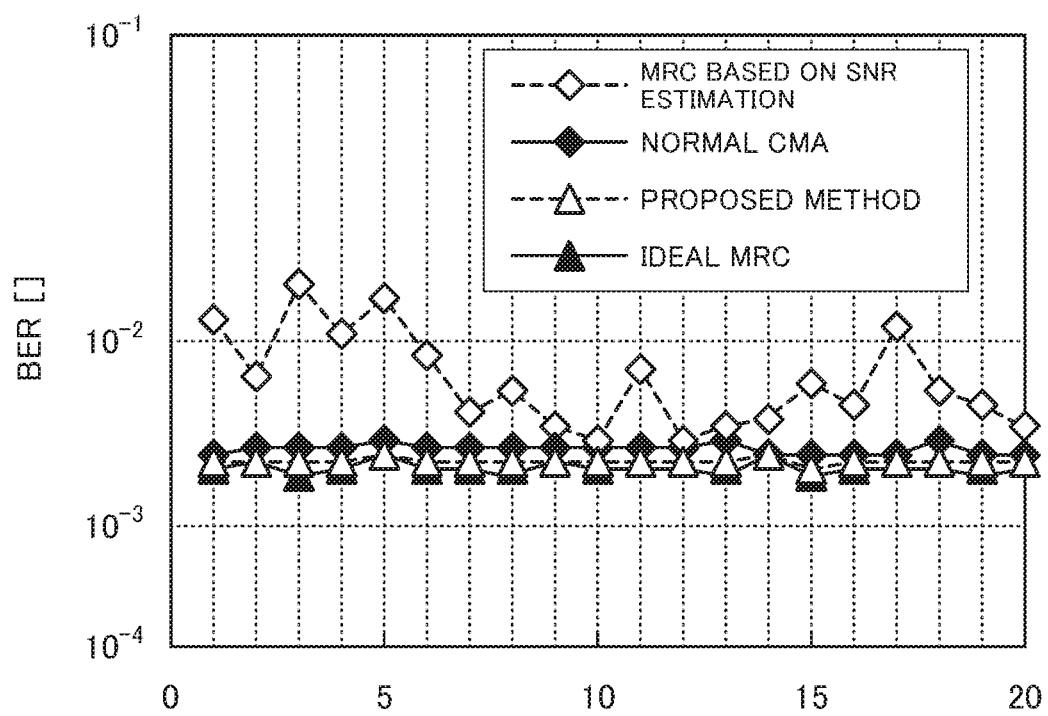
FIG. 6 is an example of a simulation result of an advantageous effect of signal processing according to the present example embodiment.

Examples of the simulation results are shown in FIG. 6. The BERs of the signals after the combining with the method of the present example embodiment ("proposed method") are improved as compared to the BERs acquired when MRC (maximum ratio combining) with SNR estimation and the adaptive control with CMA using normal FIR filters are performed. Further, the BERs of the signals after the combining with the method of the present example embodiment achieve substantially the same characteristics as in maximum ratio combining with which SNRs are calculated ideally.

Figure 7:
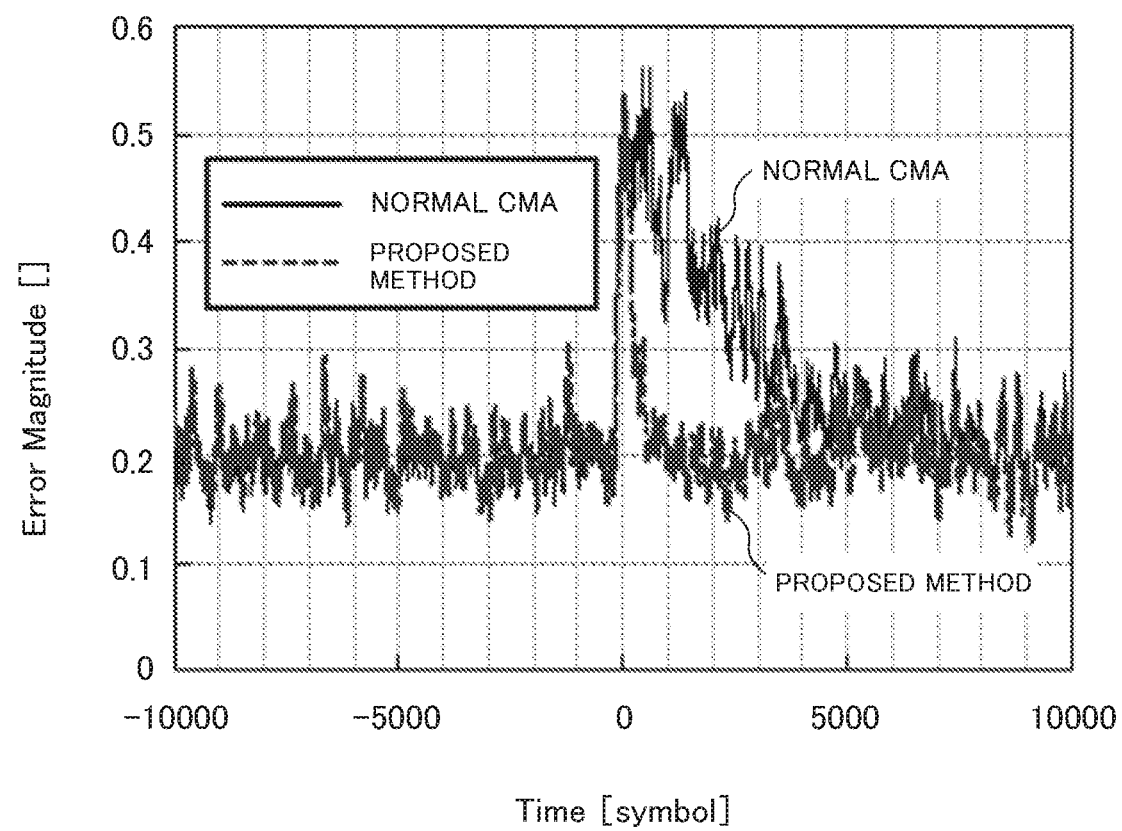
FIG. 7 is an example of a simulation result of a magnitude of an error signal.

Next, simulation is performed to a case where the reception light intensity in three modes of the six modes of the FMF is changed from −55 dBm to −70 dBm and the reception light intensity in the remaining three modes is changed from −70 dBm to −55 dBm. In the simulation, comparison is made on a state of convergence of filter coefficients between adaptive control with CMA using normal FIR filters ("normal CMA" indicated with solid lines) and the method of the present example embodiment ("proposed method" indicated with broken lines). In the method of the present example embodiment in this case, the first coefficients are dealt with statically, and by using the first coefficients, which are converged by the adaptive control under a state in which the reception light intensity in all the modes is −50 dBm, adaptive control is performed only for the second coefficients. FIG. 7 is an example of simulation results of magnitudes of error signals. In FIG. 7, running averages of one hundred samples are extracted to be shown. The adaptive control with CMA using the normal FIR filters requires a time period of approximately 10,000 symbols for re-converging the filter coefficients. In contrast, in the proposed method of the present example embodiment, it is understood that the filter coefficients are re-converged for approximately 2,000 symbols and that high-speed control can be achieved.

As described above, the maximum ratio combining unit 284 of the present example embodiment subjects the reception signals of the reception branches to the processing with the FIR filters and the processing with the one-tap filters, and then combines those signals. The filter coefficients of the filters are subjected to adaptive control by a stochastic gradient descent method in such a way that the reception signals after the combining are in a predetermined state, based on the input signals to the filters and the reception signals after the combining.

A step size for updating the filter coefficients of the FIR filters and a step size for updating the filter coefficients of the 1-tap filters are set individually. The step size for updating the filter coefficients of the 1-tap filters is larger than the step size for updating the filter coefficients of the FIR filters. Further, the update states of the FIR filter coefficients of the reception branches are switched based on the magnitudes of the 1-tap filter coefficients of the reception branches.

With the present example embodiment having the above-mentioned configuration, even when the reception signal quality of each of the reception branches fluctuates due to influence of atmospheric fluctuation, the filter coefficient appropriate for the corresponding adaptive filter can be calculated and combined at high speed and at high accuracy. In other words, the optical receiver 20 can calculate the filter coefficient at high speed and at high accuracy to combine the reception signals.

This advantageous effect can be acquired for the following reasons. When diversity combination is performed in optical space communication, main causes of degrading the reception signals of the reception branches are degradation of characteristics due to transmitting/receiving devices and SNR fluctuation due to atmospheric fluctuation. While the latter fluctuates at high speed with reflecting change in an atmospheric state, the former change is normally at low speed. In the present example embodiment, by increasing the step size for updating the filter coefficients of the 1-tap filters and reducing the step size for updating the FIR filter coefficients, the filter coefficients can be caused to follow the SNR fluctuation at high speed and the static characteristics with high accuracy.

Further, in the present example embodiment, the low SNR of the reception signal is detected from the magnitude of the filter coefficient of the 1-tap filter for each of the reception branches. As a result, the filter coefficients of the whole FIR filters can be prevented from being updated under a state in which the SNRs are low, and a time period required for re-converging the filter coefficients can be reduced.

Second Example Embodiment

In the first example embodiment, the FIR filters of the reception branches are used as the filters for compensating for characteristics of the static filters or the transmitting/receiving devices that change only at low speed. Further, the 1-tap filters are used for calculating the weightings for maximum ratio combining that follows high-speed SNR fluctuation of the reception branches due to atmospheric fluctuation. Thus, the step size for updating the second coefficients are set larger than the step size for updating the first coefficient, and the procedure of updating the first coefficients of the reception branches is switched based on the magnitudes of the second coefficients of the reception branches.

In a second example embodiment of the present invention, a condition for intensity normalization of the filter coefficients is added to the adaptive control for the first coefficients in such a way that the functions of the first coefficients and the second coefficients are separated from each other more actively.

In order to perform intensity normalization of the first coefficient of the reception branch j, in place of updating a filter coefficient in such a way as to minimize $\varepsilon^2$ similarly in the first example embodiment, the filter coefficient is updated in such a way that $\varepsilon^2 + \lambda H_j^2$, which is acquired by adding an intensity normalization member to $\varepsilon^2$, is minimized. Here, $H_j$ is expressed by Equation (9) given below, and $\lambda$ is a hyper parameter that determines strength of intensity normalization.

$$H_i = 1 - |h_i|^2 \quad (9)$$

CMA is used for the method of the adaptive control similarly in the first example embodiment. With this, updating rules of the first coefficient and the second coefficient are expressed as in assignment expressions (10) and (11) given below.

$$h_j \rightarrow h_j + \mu_j \varepsilon y q_j^* x_j^* + \lambda \mu_j H_j h_j \quad (10)$$

$$q_j \rightarrow q_j + \mu_q \varepsilon y (h_j^T x_j)^* \quad (11)$$

The coefficient monitors 361 to 363 monitor the second coefficients, and a procedure of switching the update state of the first coefficients in accordance with the magnitudes of the second coefficients is the same as in the first example embodiment.

As described above, by adding the condition of intensity normalization of the filter coefficients to the adaptive control for the first coefficients, the FIR filters of all the reception branches are easily acquired under a state in which the filter coefficients for compensating for characteristics of the transmitting/receiving devices are subjected to intensity normalization. The reception signals are input to the FIR filters of all the reception branches under a state of being subjected to intensity normalization, and hence outputs of the FIR filters of all the reception branches are under the state of being subjected to intensity normalization when the FIR filter coefficients are subjected to the intensity normalization. Further, such outputs of the FIR filters are subjected to the processing performed with the 1-tap filters, and hence it is secured that the second coefficients acquired as a result of the adaptive control are purely weightings for maximum ratio combining. As a result, when monitoring the second coefficients, more reliable results can be acquired.

Third Example Embodiment

Figure 8:
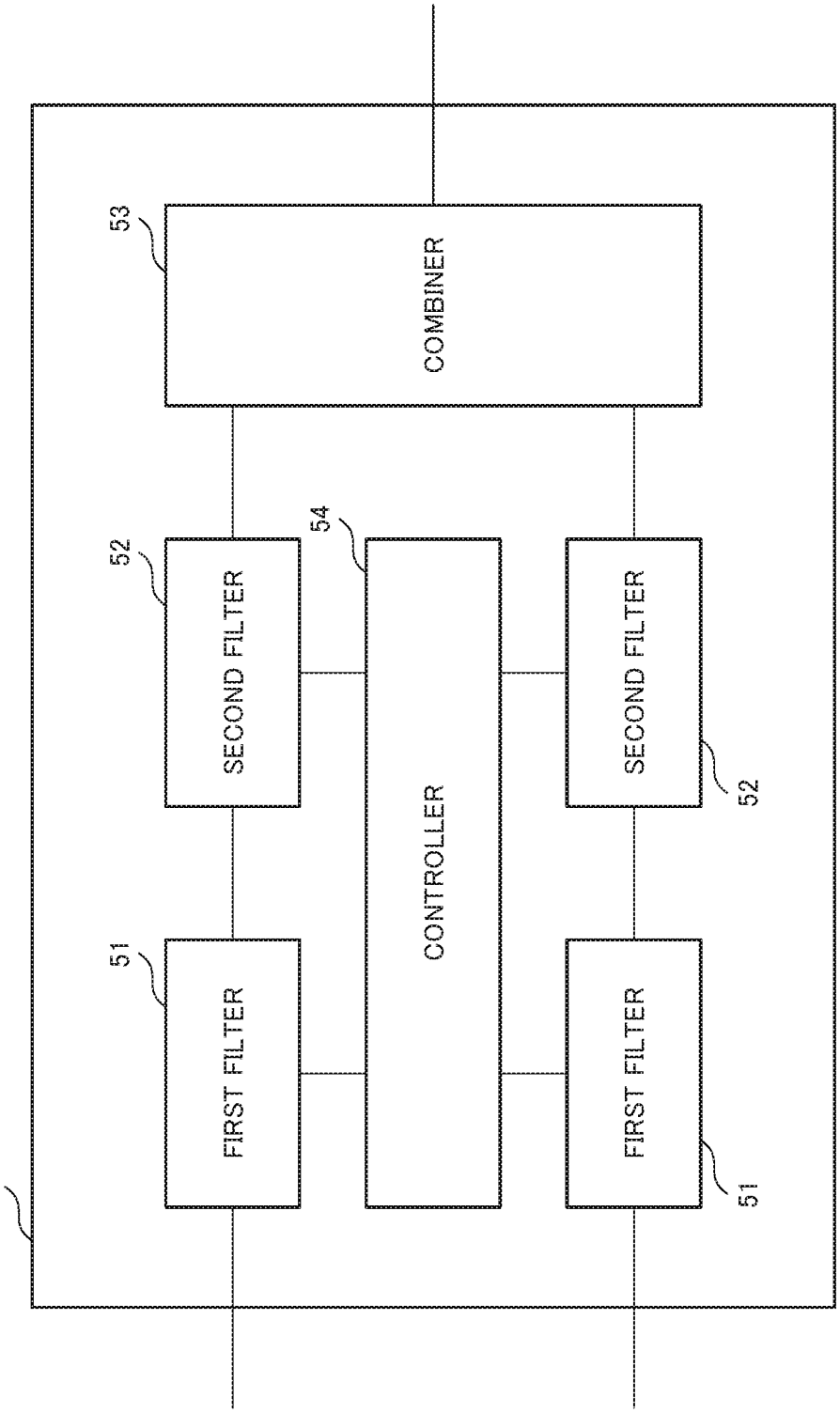
FIG. 8 is a block diagram illustrating a configuration example of a signal combining device 50.

FIG. 8 is a block diagram illustrating a configuration example of a signal combining device 50 according to a third example embodiment. The maximum ratio combining unit 284 described in the first and second example embodiments can be also referred to as the signal combining device 50 described below.

The signal combining device 50 includes a plurality of first filters 51, a plurality of second filters 52, a combiner 53, and a controller 54. The first filters 51 subject a plurality of reception signals, which are generated by subjecting optical signals to coherent detection, to processing performed with first filter coefficients. The second filters 52 subject the outputs of the first filters 51 to processing performed with second filter coefficients. The combiner 53 functions as a combination means for outputting combined signals obtain by combining outputs of the second filters. The combiner 53 is, for example, an adder. The controller 54 functions as a control means for performing adaptive control for the first filter coefficients and the second filter coefficients with different step sizes, respectively, based on the reception signals input to the first filters and the combined signals in such a way that the combined signals are in a predetermined state. The controller 54 also functions as a control means for switching the procedure of updating the filter coefficients of the first filters, based on the magnitudes of the second filter coefficients.

The signal combining device 50 having the above-mentioned configuration enables calculation of the filter coefficients at high speed and at high accuracy and combination of the reception signals. This is because the signal combining device 50 performs adaptive control for the filter coefficients of the first filters and the second filters with different step sizes, and at the same time, switches the update state of the filter coefficients of the first filters, based on the magnitudes of the second filter coefficients. As a result, accuracy and high speed of the filter coefficient calculation are secured.

Note that, the example embodiments disclosed above can be described as, but not limited to, the following supplementary notes.

(Supplementary Note 1)

A signal combining device, comprising:

a plurality of first filters configured to subject each of a plurality of reception signals to processing with first filter coefficients, the plurality of reception signals being generated by subjecting optical signals to coherent detection;

a plurality of second filters configured to subject outputs of the first filters to processing with second filter coefficients;

synthesis means for outputting combined signals acquired by combining outputs of the second filters; and control means for performing adaptive control for each of the first filter coefficients and each of the second filter coefficients with different step sizes in each other, in such a way that the combined signals are in a predetermined state, based on the reception signals input to the first filters and the combined signals, and for switching an update state of a filter coefficient of each of the first filters, based on magnitudes of the second filter coefficients.

(Supplementary Note 2)

The signal combining device according to supplementary note 1, wherein the control means performs adaptive control for the first filter coefficient, based on a condition of intensity normalization of the first filter coefficient.

(Supplementary Note 3)

The signal combining device according to supplementary note 1 or 2, wherein the first filter is a finite impulse response (FIR) filter, and the second filter is a 1-tap filter.

(Supplementary Note 4)

The signal combining device according to any one of supplementary notes 1 to 3, wherein a step size for updating the second filter coefficient is larger than a step size for updating the first filter coefficient.

(Supplementary Note 5)

The signal combining device according to any one of supplementary notes 1 to 4, wherein the control means stops update of the first filter coefficient with respect to the reception signal, when the second filter coefficient with respect to the reception signal is less than a predetermined threshold value.

(Supplementary Note 6)

The signal combining device according to any one of supplementary notes 1 to 4, wherein the control means stops update of the first filter coefficient with respect to the reception signal, when the second filter coefficient with respect to the reception signal changes from a predetermined threshold value or more to less than the predetermined threshold value.

(Supplementary Note 7)

The signal combining device according to supplementary note 6, wherein the control means starts update of the first filter coefficient with respect to the reception signal, when the second filter coefficient with respect to the reception signal changes from less than the predetermined threshold value to the predetermined threshold value or more.

(Supplementary Note 8)

The signal combining device according to any one of supplementary notes 1 to 7, further comprising down-sampling means between the first filter and the second filter.

(Supplementary Note 9)

A signal processor, comprising:

intensity normalization means for normalizing intensity of input signals;

relative delay compensation means for removing a delay between the input signals with the intensity being normalized;

relative phase compensation means for removing a phase difference between the input signals with the delay being removed;

the signal combining device according to any one of supplementary notes 1 to 8, the input signals with the phase difference removed being input to the signal combining device; and carrier phase compensation means for compensating for a carrier phase of output of the signal combining device.

(Supplementary Note 10)

An optical receiver, comprising:

mode separation means for separating received optical signals for each propagation mode;

coherent reception means for coherently receiving the optical signals being separated and outputting electric signals;

analog-to-digital conversion means for converting the electric signals to digital signals; and the signal processor according to supplementary note 9, to which the digital signals are input.

(Supplementary Note 11)

An optical space communication system, comprising:

an optical transmitter configured to transmit an optical signal for performing space optical transmission; and the optical receiver according to supplementary note 10, being configured to receive an optical signal being transmitted from the optical signal.

(Supplementary Note 12)

A signal combining method, comprising:

subjecting each of a plurality of reception signals to processing with first filter coefficients by using first filters, the plurality of reception signals being generated by subjecting optical signals to coherent detection;

subjecting each of outputs of the first filters to processing with second filter coefficients, by using second filters;

outputting combined signals acquired by combining outputs of the second filters;

performing adaptive control for each of the first filter coefficients and each of the second filter coefficients with different step sizes in each other, in such a way that the combined signals are in a predetermined state, based on the reception signals input to the first filters and the combined signals; and switching an update state of a filter coefficient of each of the first filters, based on magnitudes of the second filter coefficients.

(Supplementary Note 13)

The signal combining method according to supplementary note 12, further comprising performing adaptive control for the first filter coefficient, based on a condition of intensity normalization of the first filter coefficient.

(Supplementary Note 14)

The signal combining method according to supplementary note 12 or 13, wherein the first filter is a finite impulse response (FIR) filter, and the second filter is a 1-tap filter.

(Supplementary Note 15)

The signal combining method according to any one of supplementary notes 12 to 14, wherein a step size for updating the second filter coefficient is larger than a step size for updating the first filter coefficient (Supplementary Note 16)

The signal combining method according to any one of supplementary notes 12 to 15, further comprising stopping update of the first filter coefficient when the second filter coefficient is less than a predetermined threshold value.

(Supplementary Note 17)

The signal combining method according to any one of supplementary notes 12 to 15, further comprising stopping update of the first filter coefficient when the second filter coefficient changes from a predetermined threshold value or more to less than the predetermined threshold value.

(Supplementary Note 18)

The signal combining method according to supplementary note 17, further comprising starting update of the first filter coefficient when the second filter coefficient changes from less than the predetermined threshold value to the predetermined threshold value or more.

(Supplementary Note 19)

A control program causing a computer of a signal combining device to execute:

a procedure of subjecting each of a plurality of reception signals to processing with first filter coefficients by using first filters, the plurality of reception signals being generated by subjecting optical signals to coherent detection;

a procedure of subjecting each of outputs of the first filters to processing with second filter coefficients, by using second filters;

a procedure of outputting combined signals acquired by combining outputs of the second filters;

a procedure of performing adaptive control for each of the first filter coefficients and each of the second filter coefficients with different step sizes in each other, in such a way that the combined signals are in a predetermined state, based on the reception signals input to the first filters and the combined signals; and a procedure of switching an update state of a filter coefficient of each of the first filters, based on magnitudes of the second filter coefficients.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

Further, the configurations described in the example embodiments are not always exclusive from each other. The actions and advantageous effects of the present invention may be achieved by configurations acquired by combining the entirety or parts of the example embodiments described above.

This application is based upon and claims the benefit of priority from Japanese patent application No. 2017-086264, filed on Apr. 25, 2017, the disclosure of which is incorporated herein in its entirety by reference.

REFERENCE SIGNS LIST

1 Optical space communication system
10 Optical transmitter
20 Optical receiver
21, 91 Telescope
22, 98 Few-mode fiber
23, 99 Mode separator
24, 92 Single-mode fiber
25, 93 Coherent receiver
26, 94 Local oscillator 27, 95 Analog-to-digital converter
28, 96 Signal processor
50 Signal combining device
51 First filter
52 Second filter
53 Combiner
54 Controller
80 Adaptive filter
90, 97 Optical space communication receiver
281 Intensity normalization unit
282 Relative delay compensation unit
283 Relative phase compensation unit
284 Maximum ratio combining unit
285 Carrier phase compensation unit
311 to 313 Filter
321 to 323 Down-sampling unit
331 to 333 1-tap filter
340 Adder
341 to 343 First coefficient calculation unit
351 to 353 Second coefficient calculation unit
361 to 363 Coefficient monitor
371 to 373 Control-state switching unit
961 Relative delay compensation unit
962 Relative phase compensation unit
963 Estimation unit
964 Maximum ratio combining unit
965 Equalizing filter
966 Carrier phase compensation unit

What is claimed is:

1. A signal combining device, comprising:
a plurality of first filters configured to subject each of a plurality of reception signals to processing with first filter coefficients, the plurality of reception signals being generated by subjecting optical signals to coherent detection;
a plurality of second filters configured to subject outputs of the first filters to processing with second filter coefficients;
a combiner configured to output combined signals acquired by combining outputs of the second filters; and
a controller configured to perform adaptive control for each of the first filter coefficients and each of the second filter coefficients with different step sizes in each other, in such a way that the combined signals are in a predetermined state, based on the reception signals input to the first filters and the combined signals, and to switch an update state of a filter coefficient of each of the first filters, based on magnitudes of the second filter coefficients.

2. The signal combining device according to claim 1, wherein the controller performs adaptive control for the first filter coefficient, based on a condition of intensity normalization of the first filter coefficient.

3. The signal combining device according to claim 1, wherein the first filter is a finite impulse response (FIR) filter, and the second filter is a 1-tap filter.

4. The signal combining device according to claim 1, wherein a step size for updating the second filter coefficient is larger than a step size for updating the first filter coefficient.

5. The signal combining device according to claim 1, wherein the controller stops update of the first filter coefficient with respect to the reception signal, when the second filter coefficient with respect to the reception signal is less than a predetermined threshold value.

6. The signal combining device according to claim 1, wherein the controller stops update of the first filter coefficient with respect to the reception signal, when the second filter coefficient with respect to the reception signal changes from a predetermined threshold value or more to less than the predetermined threshold value.

7. The signal combining device according to claim 6, wherein the controller starts update of the first filter coefficient with respect to the reception signal, when the second filter coefficient with respect to the reception signal changes from less than the predetermined threshold value to the predetermined threshold value or more.

8. The signal combining device according to claim 1, further comprising a down-sampling circuit between the first filter and the second filter.

9. A signal processor, comprising:
an intensity normalization circuit configured to normalize intensity of input signals;
a relative delay compensator configured to remove a delay between the input signals with the intensity being normalized;
a relative phase compensator configured to remove a phase difference between the input signals with the delay being removed;
the signal combining device according to claim 1, the input signals with the phase difference removed being input to the signal combining device; and
a carrier phase compensator configured to compensate for a carrier phase of output of the signal combining device.

10. An optical receiver, comprising:
a mode separator configured to separate received optical signals for each propagation mode;
a coherent receiver configured to coherently receive the optical signals being separated and output electric signals;
an analog-to-digital converter configured to convert the electric signals to digital signals; and
the signal processor according to claim 9, to which the digital signals are input.

11. An optical space communication system, comprising:
an optical transmitter configured to transmit an optical signal for performing space optical transmission; and
the optical receiver according to claim 10, being configured to receive an optical signal being transmitted from the optical signal.

12. A signal combining method, comprising:
subjecting each of a plurality of reception signals to processing with first filter coefficients by using first filters, the plurality of reception signals being generated by subjecting optical signals to coherent detection;
subjecting each of outputs of the first filters to processing with second filter coefficients, by using second filters;
outputting combined signals acquired by combining outputs of the second filters;
performing adaptive control for each of the first filter coefficients and each of the second filter coefficients with different step sizes in each other, in such a way that the combined signals are in a predetermined state, based on the reception signals input to the first filters and the combined signals; and
switching an update state of a filter coefficient of each of the first filters, based on magnitudes of the second filter coefficients.

13. The signal combining method according to claim 12, further comprising performing adaptive control for the first filter coefficient, based on a condition of intensity normalization of the first filter coefficient.

14. The signal combining method according to claim 12, wherein the first filter is a finite impulse response (FIR) filter, and the second filter is a 1-tap filter.

15. The signal combining method according to claim 12, wherein a step size for updating the second filter coefficient is larger than a step size for updating the first filter coefficient.

16. The signal combining method according to claim 12, further comprising stopping update of the first filter coefficient when the second filter coefficient is less than a predetermined threshold value.

17. The signal combining method according to claim 12, further comprising stopping update of the first filter coefficient when the second filter coefficient changes from a predetermined threshold value or more to less than the predetermined threshold value.

18. The signal combining method according to claim 17, further comprising starting update of the first filter coefficient when the second filter coefficient changes from less than the predetermined threshold value to the predetermined threshold value or more.

19. A tangible and non-transitory recording medium for a control program causing a computer of a signal combining device to execute:
  a procedure of subjecting each of a plurality of reception signals to processing with first filter coefficients by using first filters, the plurality of reception signals being generated by subjecting optical signals to coherent detection;
  a procedure of subjecting each of outputs of the first filters to processing with second filter coefficients, by using second filters;
  a procedure of outputting combined signals acquired by combining outputs of the second filters;
  a procedure of performing adaptive control for each of the first filter coefficients and each of the second filter coefficients with different step sizes in each other, in such a way that the combined signals are in a predetermined state, based on the reception signals input to the first filters and the combined signals; and
  a procedure of switching an update state of a filter coefficient of each of the first filters, based on magnitudes of the second filter coefficients.

* * * * *